July 28, 1970
N. B. KING
3,522,153
METHOD OF SEPARATING XYLENE ISOMERS BY DISTILLATION WITH CRYSTALLIZATION AND ISOMERIZATION OF A SIDE STREAM
Filed April 4, 1968
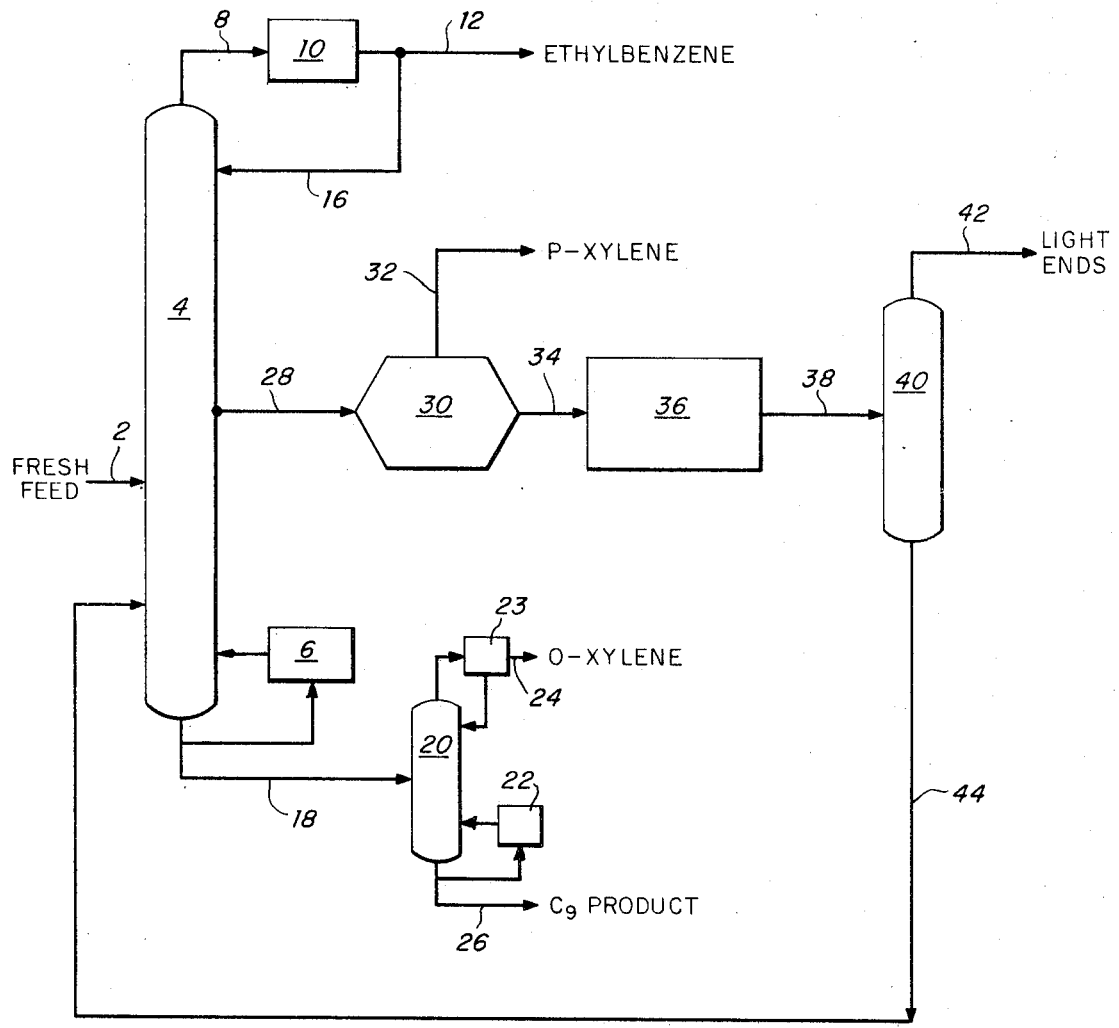
NORMAN B. KING
INVENTOR.
BY Schiller & Pandiscio
ATTORNEYS.

United States Patent Office 3,522,153
Patented July 28, 1970

3,522,153
METHOD OF SEPARATING XYLENE ISOMERS BY DISTILLATION WITH CRYSTALLIZATION AND ISOMERIZATION OF A SIDE STREAM
Norman B. King, Wayland, Mass., assignor to The Badger Company, Inc., Cambridge, Mass., a corporation of Delaware
Filed Apr. 4, 1968, Ser. No. 718,846
Int. Cl. B01d *3/34;* C07c *15/08*
U.S. Cl. 203—29                                       1 Claim

ABSTRACT OF THE DISCLOSURE

Method of separating a mixture of $C_8$ aromatic isomers involving use of a single polyfunctional distillation column to produce a stream of ethylbenzene, a second stream of ortho-xylene, and a third stream comprising a mixture rich in meta- and para-xylene. The third stream is stripped of para-xylene, then subjected to isomerization, and finally recycled back to the polyfunctional distillation column as a second feed.

---

This invention relates to the art of separating aromatic isomers from mixtures thereof and more particularly to a new and improved process for separating $C_8$ aromatic isomers.

THE PRIOR ART

In the known art of isomerization of aromatics, e.g., aromatics containing eight carbon atoms, one or more of the possible isomers is continuously converted into the other isomers under known conditions of temperature, pressure and catalytic action. To take commercial advantage of the net conversion of isomers, it is necessary to subject the isomerizate mixture thus produced to a multistage separation process, usually involving frictional distillation. In conventional practice involving isomerization and recovery of $C_8$ aromatic isomers, separate distillation processes are provided for separating each of the wanted isomers with a first stage distillation column providing an overhead product consisting of ethylbenzene and a second stage column providing a bottoms product consisting of ortho-xylene and an overhead product enriched with a mixture of meta- and para-xylene. Such practice involves extensive equipment and suffers from relatively high operating costs.

THE INVENTION

The invention has as its primary object the provision of a unique method and distillation system for effecting separation of $C_8$ aromatic isomers which constitutes an improvement over prior art processes.

A more specific object is to provide a novel distillation system for separating $C_8$ aromatic isomers which is characterized by lower capital equipment costs and lower operating costs than prior art processes.

Another specific object is to provide a process for separating $C_8$ aromatic isomers characterized by improved yields of commercially pure ethylbenzene, ortho-xylene and para-xylene.

Described briefly the invention comprises use of a single polyfunctional distillation column to separate a mixed $C_8$ aromatic stream into a first stream of commercially pure ethylbenzene, a second stream of commercially pure ortho-xylene, and a third stream of optimum composition for crystallization and isomerization of para- and meta-xylene. The latter stream is subjected to separation of para-xylene followed by isomerization and then recycling to the polyfunctional distillation column for further separation as above described.

The foregoing and other objects and many of the attendant advantages of the invention are rendered obvious by reference to the following detailed specification and the accompanying drawing which consists of a flow diagram of a preferred embodiment of the invention.

In practicing the present invention an available feed mixture of ethylbenzene and ortho-, meta- and para-xylene is distilled in a column operated with the overhead pressure in the range of 0–200 p.s.i.g. and the base pressure in the range of 20–230 p.s.i.g. The distillation is carried out in a multiplate column having at least about 250 and preferably in the order of about 365 trays and a reflux ratio from 100 to 250:1. The feed stock temperature is preferably close to the boiling point as it enters the column and the heat necessary for providing vapor flow through the column is supplied by recirculating the liquid through an auxiliary reboiler. The feedstock is introduced near the midpoint of the column. The mixture is separated into an overhead fraction containing commercially pure ethylbenzene together with light ends, a bottom fraction containing usually in excess of 95% ortho-xylene with the remainder consisting primarily of heavier hydrocarbons, and a sidestream fraction usually containing in excess of 70 mol percent and preefrably at least about 85 mol percent para- and meta-xylene, with the remainder consisting of ethylbenzene and ortho-xylene. The sidestream fraction is taken below the midpoint of the column, preferably about 20 to 30 trays below the midpoint. The bottoms fraction is treated to recover commercially pure ortho-xylene. The sidestream is first treated to recover para-xylene. Then it is passed to a catalytic isomerization system of conventional design where it is treated according to conventional practice to effect isomerization of the remaining xylenes. The isomerization product is treated to separate light end products and then fed back to the polyfunctional distillation column at a point consistant with the relative quantities of heavy and light xylene isomers, and normally in the bottom half of the column. The process is continuous.

Turning now to the flow sheet shown in the appended drawing, the raw feedstock (which usually consists of a mixture of the $C_8$ aromatic isomers noted above plus closely related hydrocarbons, e.g., $C_9$ hydrocarbons, delivered from a conventional isomerization stage) is introduced via a line 2 to a polyfunctional distillation column 4 provided with an external reboiler 6. The number of theoretical trays and the operation conditions of the column are dependent upon the purity desired of the overhead and bottoms product fractions.

Column 4 produces an ethylbenzene overhead fraction which passes via a line 8 to a liquid condenser 10. A portion of the output of condenser 10 passes via a line 12 to storage, while the remainder is refluxed via a line 16 to the top of the column. The top reflux is carried out so that the ratio of recovered overhead product to refluxed overhead product is in the order of about 1:150 on a volume basis. Under optimum operating conditions the recovered overhead product is essentially pure, i.e. 99.5+%, ethylbenzene.

The column also produces a bottoms fraction which consists almost wholly of o-xylene, with some $C_9$ and heavier hydrocarbons. This bottoms fraction is delivered via a line 18 to a small distillation column 20 provided with an external reboiler 22 and an overhead refluxing condenser 23. The number of theoretical plates and the operating conditions of column 20 are dependent upon the purity desired of its overhead fraction. Under optimum operating conditions the overhead fraction from column 20 consists of essentially pure o-xylene (99.5+%). This overhead fraction is passed to storage via a line 24, while a second bottoms fraction consisting of $C_9$ and heavier hydrocarbons (with no more than 1–2% o-xylene) is passed to storage via a line 26.

A third effluent sidestream is withdrawn from column 4 via line 28. The exact composition of this sidestream depends upon the plate from which it is taken, but essentially it is a mixture consisting primarily of meta- and para-xylene with minor amounts of o-xylene and ethylbenzene. The relative amount of meta-xylene in the sidestream effluent characteristically exceeds the relative amount of p-xylene, with the former comprising at least about 50 mol percent and the latter at least about 20 mol percent of the sidestream effluent. This sidestream effluent is passed to a crystallizer stage 30 adapted to effect fractional crystallization and removal of p-xylene. The crystallizer stage involves chilling to a temperature of between about $-30°$ C. and about $-70°$ C. to effect p-xylene crystallization and filtering or centrifuging to separate the p-xylene crystals from the mother liquid. This crystallizer stage is of conventional design and is operated in a manner well known to persons skilled in the art. By way of example but not limitation, the crystallizer may be constructed and operated in accordance with the teachings of U.S. Pats. 1,940,065 or 2,866,833. The crystallizer also may be of the type described in U.S. Pat. 2,622,115 which provides multiple contacts between crystallizing p-xylene and reflux liquid, with each solid-liquid contact causing a portion of the p-xylene solid to melt and a portion of the p-xylene in the reflux liquid to solidify, with the result that the solid product when separated is substantially pure p-xylene. The solid p-xylene separated in crystallizer stage 30 is melted and delivered via a line 32 to storage. Under optimum operating conditions this product consists of about 98–99.5% para-xylene. The mother liquid effluent from crystallizer stage 30 consists primarily of meta-xylene, with minor amounts of para- and ortho-xylene and ethylbenzene. This effluent is passed via a line 34 to an isomerization stage 36 where its meta-xylene constituent is subjected to controlled isomerization to produce ortho- and para-xylene. The isomerization preferably is carried out by contacting the effluent delivered via line 34 with a silica-alumina catalyst at a temperature of between about 700° and 1000° F. according to the method outlined in U.S. Pat. 2,837,582. Alternately it may be carried out in the presence of an $HF-BF_3$ catalyst according to the teachings of U.S. Pat. 2,848,517. The reaction product stream from isomerization stage 36 is passed via line 38 to a small fractional distillation column 40. Although not shown, it is to be understood that column 40 may be provided with a reboiler and condenser similar to columns 4 and 20. The number of theoretical trays and the operating conditions of column 40 are set according to the desired purity of overhead and bottom product fractions. The overhead product fraction, which consists primarily of light ends of $C_7$ and lighter hydrocarbons, is removed to storage via a line 42. The bottom product fraction, which consists of o-, p- and meta-xylene, ethylbenzene, and a very small amount of $C_9$ and heavier hydrocarbons, is delivered via a line 44 back to the polyfunctional distillation column as a second feed. This second feed is then processed in the manner above described together with additional fresh feed.

The invention is further illustrated by the following specific example based upon the preferred embodiment described above.

EXAMPLE

Line 2 delivers a feed stock stream having a composition as follows: ethylbenzene, 46 mols per hour; and para-xylene, 55 mols per hour; meta-xylene, 121 mols per hour; and ortho-xylene, 76 mols per hour. The amount of toluene and $C_7$ and $C_9$ hydrocarbons in the feed stock is small but undetermined. The distillation column 4 contains 366 trays and has a reflux ratio of 142 to 1. The reboiler 6 is operated so as to provide 6850 mols of vapor to the base of the column. The column is operated with a base pressure of about 70 p.s.i.g., an overhead pressure of about 15 p.s.i.g., a base temperature of about 437° F. and an overhead temperature of about 342° F. The feedstock stream is introduced onto the 170th tray measured up from the base of the column. The second feed stream delivered by line 44 is introduced onto the 60th tray measured from the bottom of the column. The sidestream fraction is withdrawn by line 28 from the 93rd tray up from the base of the column.

Under the foregoing operating conditions, 6870 mols of vapor per hour are delivered via line 8 to condenser 10, from which 6824 mols of condensate are returned to the top of column 4 as reflux and 46 mols are recovered as product. This product is essentially 99.5% ethylbenzene with small traces of p- and m-xylene. The liquid removed from the base of column 4 via line 18 consists of 137 mols per hour of o-xylene plus a small amount of heavier (primarily $C_9$) hydrocarbons. This base stream is processed in distillation column 20 to achieve an overhead fraction consisting of 99.5+% o-xylene and a bottoms product consisting of the heavier hydrocarbons.

Line 28 removes approximately 609 mols of liquid per hour from column 4. The composition of this sidestream liquid is approximately as follows: ethylbenzene, about 31 mols; para-xylene, about 167 mols; meta-xylene about 368 mols; and ortho-xylene, about 43 mols. In the crystallization stage 30, the sidestream is subjected to cooling to a temperature of about $-50°$ C. to effect crystallization of para-xylene. The latter is separated from the remaining liquid. About 94 mols per hour of para-xylene are separated in the crystallization stage and the remaining liquid is passed to the isomerization stage 36 where it is converted under the influence of a silica-alumina catalyst to an isomerizate products stream made up as follows: 31 mols per hour of ethylbenzene; 112 mols of para-xylene; 247 mols of meta-xylene; 104 mols of othro-xylene; and very small amounts of lighter and heavier hydrocarbons. This stream is fed to distillation column 40 where the lighter hydrocarbons are separated and removed via line 42. After separation of the light ends the isomerizate products stream is fed back via line 44 to column 4. The isomerizate products stream consists of the following: 31 mols/hr. of ethylbenzene; 112 mols/hr. of para-xylene; 247 mols per hour of meta-xylene; 104 mols per hour of ortho-xylene; and a small amount (undetermined) of $C_9$ and heavier hydrocarbons. In column 4 the isomerizate products stream undergoes fractionation together with fresh feedstock in the manner above described.

The process described above is flexible and the operating conditions may be modified in the manner best suited for any particular feedstock. The process affords a number of other advantages. It permits a $C_8$ isomer mixture to be separated into those components which have greatest commercial value and simultaneously maximize the yield of such components by diminishing the amount of the last valuable component, m-xylene. It also avoids the need for two or more large fractionating columns operated in tandem or in sequence to effect separation of ethylbenzene and o-xylene from p- and m-xylene, thereby reducing capital equipment costs. A further advantage is that the heat required to reboil column 4 is less than the total of heats which would be required to reboil separate ethylbenzene and ortho-xylene fractionating columns. Additional steam may be generated from the heat recovered from the overhead effluent of column 4 as a result of condensation in condenser 10. Still another advantage is that the method permits recovery of commercially pure ethylbenzene and o- and p-xylene.

While a particular example of the invention has been described in detail, it should be understood that the invention is not limited thereto since many parameters such as pressures, feedstock composition, flow rates, distallation column size, the number of recrystallization cycles required to obtain p-xylene of desired purity, the type of catalyst required to effect isomerization of the effluent from the crystallizer stage, etc., may be varied to an extent that may be readily determined by those skilled in the art in view of the foregoing description. Accordingly the invention is not to be limited by the particular example herein set forth but only by the following claim.

I claim:
1. A method of separating selected $C_8$ aromatic hydrocarbons from a mixture containing predominantly ethylbenzene and ortho-, meta- and para-xylenes comprising, fractionally distilling said mixture in a first distillation column having at least 250 distillation stages and an overhead reflux ratio of at least 100:1 and withdrawing from said column (a) an overhead fraction of substantially commercially pure ethylbenzene, (b) a bottoms fraction comprising at least about 95 mol percent ortho-xylene, and (c) a sidestream fraction containing at least 70 mol percent para- and meta-xylenes, recovering o-xylene from said bottoms fraction by separation from heavier than $C_8$ hydrocarbons, treating said sidestream fraction to effect crystallization of para-xylene, recovering the crystallized para-xylene and then passing said sidestream fraction to an isomerization stage for conversion of at least part of its meta-xylene content to ortho- and para-xylene, fractionally distilling said sidestream fraction to separate $C_7$ and lighter hydrocarbons, and then returning said sidestream fraction to said first column.

References Cited
UNITED STATES PATENTS

| | | | |
|---|---|---|---|
| 2,532,276 | 12/1950 | Birch | 260—674 |
| 2,533,232 | 12/1950 | Dressler | 260—674 |
| 2,632,779 | 3/1953 | Pfennig | 260—674 |
| 2,741,646 | 4/1956 | Clark | 260—674 |
| 2,890,252 | 6/1959 | Cottle | 260—674 |
| 2,959,626 | 11/1960 | Krausse et al. | 203—84 |
| 3,177,264 | 4/1965 | Buchsbaum et al. | 260—674 |
| 3,254,024 | 5/1966 | Huckins et al. | 260—674 |
| 3,281,337 | 10/1966 | Zahnstecher et al. | 203—80 |

WILBUR L. BASCOMB, Jr., Primary Examiner

U.S. Cl. X.R.

203—48, 78, 80, 84, 98, 99; 260—674